US011078323B2

(12) United States Patent
Brisar et al.

(10) Patent No.: US 11,078,323 B2
(45) Date of Patent: Aug. 3, 2021

(54) SILANE COUPLING AGENTS

(71) Applicant: Henkel AG & Co. KGaA, Duesseldorf (DE)

(72) Inventors: Rok Brisar, Rostock (DE); Udo Kragl, Kritzmow (DE); Jan-Erik Damke, Duesseldorf (DE); Johann Klein, Duesseldorf (DE); Esteban Mejia, Rostock (DE)

(73) Assignee: Henkel AG & Co. KGaA, Duesseldorf (DE)

(*) Notice: Subject to any disclaimer, the term of this patent is extended or adjusted under 35 U.S.C. 154(b) by 113 days.

(21) Appl. No.: 16/656,693

(22) Filed: Oct. 18, 2019

(65) Prior Publication Data

US 2020/0048406 A1 Feb. 13, 2020

Related U.S. Application Data

(63) Continuation of application No. PCT/EP2018/060153, filed on Apr. 20, 2018.

(30) Foreign Application Priority Data

Apr. 25, 2017 (EP) .................... 17167870

(51) Int. Cl.
| | |
|---|---|
| *C08G 18/83* | (2006.01) |
| *C08G 18/28* | (2006.01) |
| *C08G 18/10* | (2006.01) |
| *C08G 18/48* | (2006.01) |
| *C08G 18/72* | (2006.01) |
| C07F 7/18 | (2006.01) |
| C07F 7/08 | (2006.01) |

(52) U.S. Cl.
CPC ........... *C08G 18/837* (2013.01); *C08G 18/10* (2013.01); *C08G 18/48* (2013.01); *C08G 18/72* (2013.01); *C07F 7/081* (2013.01); *C07F 7/18* (2013.01)

(58) Field of Classification Search
CPC ..... C08G 18/289; C08G 18/837; C07F 7/081; C07F 7/18
See application file for complete search history.

(56) References Cited

U.S. PATENT DOCUMENTS

| | | | |
|---|---|---|---|
| 3,632,557 | A | 1/1972 | Brode et al. |
| 5,364,955 | A | 11/1994 | Zwiener et al. |
| 6,162,938 | A | 12/2000 | Hansen et al. |
| 8,609,800 | B2 | 12/2013 | Boudet et al. |
| 2016/0369036 | A1 | 12/2016 | Kramer et al. |

FOREIGN PATENT DOCUMENTS

| | | |
|---|---|---|
| DE | 102008020979 A1 | 10/2009 |
| EP | 0520426 A1 | 12/1992 |

OTHER PUBLICATIONS

"The Reaction of Amides with Isocyanates. II. N-Substituted Amides" authored by Wiley and published in JACS (1947) 71, 3746-3747.*
International Search Report for International PCT Patent Application No. PCT/EP2018/060153 dated Jul. 17, 2018.
Sami, S.; Yildirim, E.; Yurtsever, M.; Yurtsever, E.; Yilgor, E; Yilgor, I.; Wilkes, G. L.; Polymer, 2014. 55(18): p. 4563-4576.
DIN 55672-1:2007-08.

* cited by examiner

*Primary Examiner* — Marc S Zimmer
(74) *Attorney, Agent, or Firm* — James E. Piotrowski

(57) ABSTRACT

The present invention discloses silylated polyurethanes obtainable by reacting at least one polyols, at least one polyisocyanates, at least one amide-functionalized silanes of the general formula (I) as described herein and their preparation methods, curable compositions comprising the silylated polyurethanes and their use as adhesive, sealant, spray foam and/or coating.

14 Claims, No Drawings

SILANE COUPLING AGENTS

The present invention relates to silylated polyurethanes obtainable by reacting at least one polyol, at least one polyisocyanate, at least one amide-functionalized silane and their preparation methods, curable compositions comprising the silylated polyurethane and their use as adhesive, sealant, spray foam and/or coating.

Polymer systems having reactive alkoxysilyl groups are known. In the presence of atmospheric moisture these alkoxysilane-terminated polymers are capable of condensing with one another even at room temperature, eliminating the alkoxy groups. Depending on the content of alkoxysilyl groups and their structure, this causes mainly long-chain polymers (thermoplastics), relatively coarse-meshed three-dimensional networks (elastomers) or highly crosslinked systems (thermosets) to form.

One-component, moisture-curing adhesives and sealants have played a significant role in many technical applications for years. In addition to the polyurethane adhesives and sealants having free isocyanate groups and the traditional silicone adhesives and sealants based on dimethyl polysiloxanes, the use of so-called modified silane adhesives and sealants has also gained ground in recent times. As compared with polyurethane adhesives and sealants, silane-modified adhesives and sealants have the advantage of being free from isocyanate groups, in particular monomeric diisocyanates, and they are also distinguished by a broad spectrum of adhesion on a wide range of substrates without surface pretreatment with primers.

Polymers end-capped with urethane-bonded alkoxysilane groups, which are obtainable by the reaction of isocyanatosilanes and alcohols, generally present important issues relating to their high viscosity and relatively low thermal stability. Urethane groups present an important advantage over urea-linkages due to their weaker intermolecular hydrogen bonding, resulting in polymers with lower viscosities. The influence of hydrogen bonding in polyurethanes is investigated in depth in by Wilkes et al. (Sami, S.; Yildirim, E.; Yurtsever, M.; Yurtsever, E.; Yilgor, E.; Yilgor, I.; Wilkes, G. L.; Polymer, 2014. 55(18): p. 4563-4576). They showed that ordered structures can be formed inside the polymer matrix, which are connected by hydrogen bonds. These so-called "hard segments" restrict the chain movement and therefore increase the viscosity of the polymer.

Aminoalkoxysilanes are frequently used in adhesive formulations as polymer endcapping agents for moisture curable compositions. Various aminoalkoxysilanes used for endcapping polymers are disclosed in U.S. Pat. Nos. 3,632,557, 6,162,938, 5,364,955 and so on. The resulting functional group from the reaction of amine with isocyanate-terminated polymers is urea. Urea linkage serves as an important group in the adhesive formulations due to its stability and hydrophilic character. However, its ability to form strong hydrogen bonds increases significantly the viscosity of the prepolymer after the end-capping. Increased viscosity limits the processability of the final product and needs to be avoided in some cases. In addition, primary amine-functionalized alkoxysilanes are extremely reactive towards many electrophiles, for example, like isocyanates, aldehydes and anhydrides, which make them difficult to handle and store. Fast and highly exothermic reactions impose processing and safety difficulties in the larger scale. Furthermore high reaction rates often result in low reaction selectivity and oligomerization.

Therefore, a need still exists for the coupling agents, endcapping agents (also called "endcappers") which make available to provide silane-modified polymers which overcome the above-mentioned drawbacks.

The object of the present invention is therefore to provide silane-modified polymers which overcome the above-mentioned drawbacks.

It has been surprisingly found that the object is achieved by introducing amide-functionalized silanes having the general formula (I) as described herein. The introduction of the amide-functionalized silane having the general formula (I) affects the viscosity of the prepolymer and mechanical properties of the cured composition.

The silane coupling agents having the general formula (I) as described herein can be used as an additive, endcapping agent, surface treating agent, etc. in adhesives, based on polyethers, sealants, spray foam and coatings in many areas such as construction, electronic, communication, aerospace, cosmetic and medicine, etc.

In a first aspect, the present invention provides a silylated polyurethane obtainable by reacting:

a) at least one polyol having a number average molecular weight of from 1000 to 50,000 g/mol;
b) at least one polyisocyanate, diisocyanate; and
c) at least one amide-functionalized silane of the general formula (I)

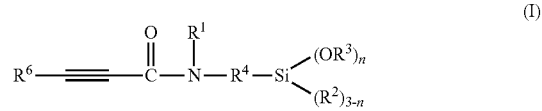

wherein
$R^1$ is hydrogen; $R^2$ and $R^3$ are same or different and are, independently from one another, selected from the group consisting of hydrogen and substituted or unsubstituted hydrocarbon residues, alkyl or aryl residues, more alkyl residues, having 1 to 20 carbon atoms, 1 to 8 carbon atoms, most methyl, ethyl, or n-propyl residue; $R^4$ is selected from linear or branched, substituted or unsubstituted hydrocarbon residues, alkyl residues, having 1 to 20 carbon atoms, 1 to 8 carbon atoms, more ethyl, n-propyl or n-butyl residue; $R^6$ is selected from the group consisting of hydrogen and linear or branched, substituted or unsubstituted hydrocarbon residues, alkyl or aryl residues, having 1 to 20 carbon atoms, 1 to 8 carbon atoms, more methyl, ethyl or n-propyl residue; and
n is 0, 1, 2 or 3, 3.

The term "at least one," as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

A "polyol" is understood for purpose of the present invention as a polymer having at least two hydroxyl groups. In principle, a large number of polymers carrying at least two hydroxyl groups, such as polyester polyols, polycaprolactones, polybutadienes or polyisoprenes as well as hydrogenation products thereof, or also polyacrylates or polymethacrylates, can be used as polyol. Mixtures of different polyols can also be used.

According to the present invention, a polyether polyol is used as the polyol. A "polyether" is understood for purpose of the present invention as a polymer whose repeating unit contains ether functionalities C—O—C in the main chain. Polymers having lateral ether groups, such as cellulose ethers, starch ethers, and vinyl ether polymers, as well as polyacetals, are therefore not covered by this definition.

Polymers which contain polyethers as backbone have a flexible and elastic structure with which compositions that have outstanding elastic properties can be manufactured. Polyethers are not only flexible in their backbone, but also strong at the same time. Thus, for example, polyethers (in contrast to e.g., polyesters) are not attacked or decomposed by water and bacteria.

In preferred embodiments of the present invention, the polyol is a polyoxyalkylene, in particular polyethylene oxide and/or polypropylene oxide.

Polyethers that have been modified by vinyl polymers are also suitable for use as a polyol component. Products such as these are obtainable, for example, by polymerizing styrene and/or acrylonitrile, or a mixture thereof, in the presence of polyethers.

In preferred embodiments of the present invention, the polyol has a polydispersity (PD) of less than 2, less than 1.5, and more less than 1.3.

The number average molecular weight $M_n$, is understood as the arithmetically averaged molecular weight of the polymer. This, like the weight averaged molecular weight $M_w$, can be determined by gel permeation chromatography (GPC, also SEC) with tetrahydrofuran (THF) as the eluent according to DIN 55672-1:2007-08, at 35° C. This method is known to one skilled in the art. The polydispersity is derived from the average molecular weights $M_w$ and $M_n$. It is calculated as $PD=M_w/M_n$.

The ratio $M_w/M_n$, also referred to as "polydispersity," indicates the width of the molecular weight distribution and thus the differing degrees of polymerization of the individual chains in polydisperse polymers. For many polymers and polycondensates, the applicable polydispersity value is approximately 2. Strict monodispersity would exist for a value of 1. A low polydispersity (for example, less than 1.5) indicates a comparatively narrow molecular weight distribution and thus the specific expression of properties associated with molecular weight, for example viscosity.

Particularly advantageous viscoelastic properties can be achieved if polyoxyalkylene polymers that possess a narrow molecular weight distribution, and therefore a low polydispersity, are used as polymeric backbones. These can be manufactured, for example, by so-called double metal cyanide catalysis (DMC catalysis). These polyoxyalkylene polymers are notable for a particularly narrow molecular weight distribution, a high average molecular weight, and a very small number of double bonds at the ends of the polymer chains. Polyoxyalkylene polymers of this kind have a polydispersity PD of at most 1.7.

Particularly preferred organic backbones are, for example, polyethers having a polydispersity from approximately 1.01 to approximately 1.3, in particular approximately 1.05 to approximately 1.18, for example approximately 1.08 to approximately 1.11.

In preferred embodiments of the present invention, the polyol has a number average molecular weight ($M_n$) of from 1000 to 50,000 g/mol, from 4000 to 30,000 g/mol, more from 4000 to 25,000 g/mol. Polyether polyol having a number average molecular weight of from 4,000 to 22,000, in particular of from 4,000 to 15,000 g/mol, are particularly preferred.

Mixtures of multiple polymers having different molecular weights, can also be used according to the present invention instead of pure polymers. In this case the statements with regard to polydispersity and molecular weight, are to be understood in such a way that, advantageously, each of the polymers on which the mixture is based exhibits a polydispersity in the preferred range, but the preferred molecular weight ranges refer to the value averaged over the entire mixture of the polymers that are used.

Commonly used polymers are polyoxymethylene homo- and copolymers, polyurethanes, vinyl butyrates, vinyl polymers, e.g. polymers containing vinyl chloride and/or vinyl acetate, rayon, ethylene copolymers such as e.g. ethylene-vinyl acetate copolymers, ethylene-acrylic acid copolymers, ethylene-acrylate copolymers, organic rubbers, mixtures of different silylated polymers, such that the backbone can also contain silyl groups. Examples include polyethers based on ethylene oxide, propylene oxide, and tetrahydrofuran, polyacrylate, and polymethacrylate. Of the aforesaid polymer backbones, polyethers and polyurethanes are preferred. Polyethers based on polyethylene oxide and/or polypropylene oxide, in particular polypropylene glycol, are particularly preferred. Polymers that contain polyethers as a backbone exhibit a flexible and elastic structure in the polymer backbone. Compositions that exhibit outstanding elastic properties can be manufactured therewith. Polyethers are not only flexible in their framework, but also at the same time strong. For example, they are not attacked or decomposed by water and bacteria and are therefore notable for relative stability (in contrast to polyesters) with respect to environmental influences. The polymer, made up of an organic backbone having carbon atoms in the main chain, contained in the silane-crosslinking adhesive or sealant according to the present invention, does not include inorganic polymers such as, for example, polyphosphates, polysilanes, polysiloxanes, polysulfides. The advantage of the embodiment according to the present invention, in particular of the use of polyurethanes and polyethers, as compared with silicone-based binders or other inorganic polymers, is good adhesion to a very wide variety of substrates, good spreadability, no contamination of the substrate with silicones, and the highly elastic framework structure.

The polyisocyanates suitable for the present invention are diisocyanate or triisocyanate, more diisocyanate. They can be selected from ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis (2-isocyanatoethyl) fumarate, as well as mixtures of two or more thereof, 1-isocyanato-3,3,5-trimethyl-5-isocyanatomethyl-cyclohexane (isophorone diisocyanate, IPDI), 2,4- and 2,6-hexahydrotoluoylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), or partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate as well as partially or completely hydrogenated cycloalkyl derivatives thereof, 4,4'-diisocyanatophenylperfluorethane, phthalic acid bisisocyanatoethyl ester, 1-chloromethylphenyl-2,4- or -2,6-diisocyanate, 1-bromomethylphenyl-2,4- or -2,6-diisocyanate, 3,3-bischloromethyl ether-4,4'-diphenyldiisocyanate, sulfur-containing diisocyanates such as those obtainable by reacting 2 mol diisocyanate with 1 mol thiodiglycol or dihydroxyhexylsulfide, the di- and triisocyanates of the di- and trimer fatty acids, or mixtures of two or more of the aforesaid diisocyanates. It is also possible to use as polyisocyanates trivalent or higher-valence isocyanates such as those obtainable, for example, by oligomerization of diisocyanates, in particular by oligomerization of the aforementioned isocyanates. Examples of such trivalent and higher-valence polyisocyanates are the triisocyanurates of HDI or IPDI or mixtures thereof, or mixed triisocyanurates thereof, as well as polyphenylmethylene polyisocyanate as obtainable by phosgenation of aniline-formaldehyde condensation products.

In the general formula (I)

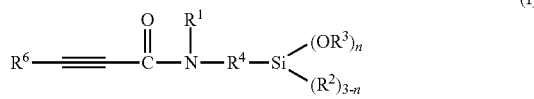

(I)

$R^1$ is hydrogen; $R^2$ and $R^3$ are same or different and are, independently from one another, selected from the group consisting of hydrogen and substituted or unsubstituted hydrocarbon residues, alkyl or aryl residues, having 1 to 20 carbon atoms, 1 to 8 carbon atoms. $R^2$ and $R^3$ are, independently from one another, alkyl residues having 1 to 8 carbon atoms, more methyl, ethyl or n-propyl residue. $R^4$ is selected from linear or branched, substituted or unsubstituted hydrocarbon residues, alkyl residues, having 1 to 20 carbon atoms, 1 to 8 carbon atoms, more ethyl, n-propyl or n-butyl residue. $R^6$ is selected from the group consisting of hydrogen and linear or branched, substituted or unsubstituted hydrocarbon residues, alkyl or aryl residues, having 1 to 20 carbon atoms, 1 to 8 carbon atoms. $R^6$ is selected from alkyl residues having 1 to 8 carbon atoms, more methyl, ethyl or n-propyl residue. n is 0, 1, 2 or 3, 3.

The term "substituted hydrocarbon residues," as used in this connection, means that one or more carbon atoms and/or hydrogen atom(s) of the hydrocarbon residues are replaced by at least one heteroatom(s) or functional group(s). Heteroalkyl groups in which one or more carbon atoms are replaced by heteroatom(s), particularly selected from O, S, N, and/or Si, are obtained by the replacement of one or more carbon atoms by heteroatom(s). Examples of such heteroalkyl groups are, without limitation, methoxymethyl, ethoxyethyl, propoxypropyl, methoxyethyl, isopentoxypropyl, ethylaminoethyl, trimethoxypropylsilyl, etc. Functional groups that can replace the hydrogen atoms are selected particularly from =O=S, —OH, —SH, —NH$_2$ —NO$_2$, —CN, —F, —Cl, —Br, —I, —OCN, —NCO, $C_{3-8}$ cycloalkyl, $C_{6-14}$ aryl, a 5-10-membered heteroaryl ring, in which 1 to 4 atoms constituting the ring independently are nitrogen, oxygen, or sulfur, and a 5-10-membered heteroalicyclic ring, in which 1 to 3 atoms constituting the ring are independently nitrogen, oxygen, or sulfur.

The amide-functionalized silane compound having the general formula (I) is obtainable by reacting at least one aminosilane having a primary amino group with at least one compound having the general formula (II)

(II)

wherein
$R^5$ is a hydrolysable group selected from the group consisting of hydroxyl group, alkoxy or aryloxy residues having 1 to 20 carbon atoms, alkoxy residues having 1 to 8 carbon atoms, which can be interrupted by at least one heteroatom selected from N, O, and/or S, alkoxide, triflate, tosylate, and halogens, Cl or Br, more Br; and $R^6$ is the same as defined for the general formula (I).

In preferred embodiments, $R^5$ is selected from the group consisting of hydroxyl group and alkoxy residues having 1 to 20 carbon atoms, alkoxy residues having 1 to 8 carbon atoms. In more preferred embodiments, the compound having the general formula (II) is an unsaturated carboxyl functional compound.

A carbodiimide can be used as a dehydration agent when the compound having the general formula (II) is a carboxylic acid. Suitable carbodiimides are selected from the group consisting of N,N'-dicyclohexylcarbodiimide, 1-[3-(dimethylamino)propyl]-3-ethylcarbodiimide methiodide, 1-tert-butyl-3-ethylcarbodiimide, N,N'-di-tert-butylcarbodiimide, N,N'-diisopropylcarbodiimide, N-(3-dimethylaminopropyl)-N'-ethylcarbodiimide, 1,3-di-p-tolylcarbodiimide, N,N'-dibutylcarbodiimide, N,N'-di(tertbutyl)carbodiimide, N,N'-dibenzylcarbodiimide. Preferred carbodiimides are N,N'-dicyclohexylcarbodiimide and N,N'-diisopropylcarbodiimide.

In preferred embodiments, the aminosilane having a primary amino group has the general formula (III)

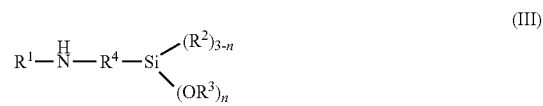

(III)

wherein, $R^1$ to $R^4$ and n are the same as defined for the general formula (I).

Preferably, the aminosilane is aminoalkylenealkoxysilane. More, the aminoalkylenealkoxysilane is selected from the group consisting of gamma-aminopropyltrimethoxysilane, gamma-aminopropyltriethoxysilane, gamma-aminopropylmethyldiethoxysilane, gamma-aminopropylmethyldimethoxysilane, gamma-aminopropyltriisopropoxysilane, gamma-aminopropylmethyldiisopropoxysilane, alpha-aminomethyltriethoxysilane, alpha-aminomethyltrimethoxysilane, alpha-aminomethyldiethoxymethylsilane, alpha-aminomethyldimethoxymethylsilane, alpha-aminomethyltriisopropoxysilane, alpha-aminomethyldiisopropoxymethylsilane, gamma-aminopropylsilanetriol, gamma-aminopropylmethylsilanediol or mixtures thereof.

$R^6$ is by preference selected from linear or branched, substituted or unsubstituted hydrocarbon residues, alkyl or aryl residues, having 1 to 20 carbon atoms, 1 to 8 carbon atoms, which can contain OH groups, epoxy or alkoxy groups. Alkyl residues having 1 to 3 carbon atoms are particularly preferred. This is advantageous because low molecular weight additives with $R^6 < C_8$ tend to have lower melting points and can easily be incorporated. Additives with $R^6 > C_8$ tend to be waxy, and as a result are more poorly processable and tend to contribute to the buildup of an undesirably high viscosity in the binder. Most, $R^6$ is selected from methyl, ethyl or n-propyl residue.

If compounds in which $R^6$ represents a longer chain, are used, the desired additive effect is achieved by means of substances that comprise less silane in absolute terms. The absolute number of additional network points (=network density), which contribute to an increase in viscosity, strength and brittleness, is thus smaller. With a smaller number of network points, adhesives or sealants that are more elastic and higher polymer elongations are observed.

Synthesis of amide-functionalized silane having the general formula (I) is usually conducted at a broad range of temperatures, e.g., from −10 to 120° C. For the temperature sensitive reactants (like propiolic acid) lower temperatures are preferred, ranging from −10 to 30° C. under argon or nitrogen atmosphere. Usually the compounds having the general formula (II), carboxyl functional compounds, are added in 5 to 30% excess. The unreacted carboxyl functional compounds are removed after the reaction using vacuum.

The reaction is conducted in water-free polar solvents like toluene, acetonitrile, tetrahydrofuran, ethylene glycol, dimethyl ether, diethyl ether, benzene, ethyl acetate, propylene carbonate, ethylene carbonate, isopropanol, butanol, ethylene glycol, n-propanol, ethanol, methanol, chloroform, chloromethane, in dichloromethane.

Reaction times vary from 0.5 to 12 hours, from 1 to 3 hours.

In another aspect the present invention provides a method for preparing a silylated polyurethane by reacting:
a) at least one polyol having a number average molecular weight of from 1000 to 50,000 g/mol;
b) at least one polyisocyanate, diisocyanate; and
c) at least one amide-functionalized silane of the general formula (I)

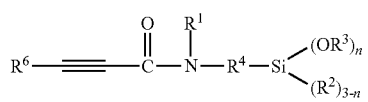

wherein
R$^1$ is hydrogen; R$^2$ and R$^3$ are same or different and are, independently from one another, selected from the group consisting of hydrogen and substituted or unsubstituted hydrocarbon residues, alkyl or aryl residues, having 1 to 20 carbon atoms, 1 to 8 carbon atoms, R$^2$ and R$^3$ are, independently from one another, alkyl residues having 1 to 8 carbon atoms, more methyl, ethyl or n-propyl residue. R$^4$ is selected from linear or branched, substituted or unsubstituted hydrocarbon residues, alkyl residues, having 1 to 20 carbon atoms, 1 to 8 carbon atoms, more ethyl, n-propyl or n-butyl residue. R$^6$ is selected from the group consisting of hydrogen and linear or branched, substituted or unsubstituted hydrocarbon residues, alkyl or aryl residues, having 1 to 20 carbon atoms, 1 to 8 carbon atoms. R$^6$ is selected from alkyl residues having 1 to 8 carbon atoms, more methyl, ethyl or n-propyl residue. n is 0, 1, 2 or 3, 3.

The amide-functionalized silanes of the general formula (I) can be added to NCO-terminated prepolymers or can be blended with polyisocyanates prior to the reaction with polyols.

In preferred embodiments of the present invention, without limitation, the silylated polyurethane is obtainable by
(a) reacting at least one polyol having a number average molecular weight of from 1000 to 50,000 g/mol with at least one polyisocyanate, diisocyanate, with a stoichiometric excess of the NCO group of the polyisocyanate(s) with respect to the OH group of the polyol(s) to form a NCO-terminated polyurethane prepolymer; and
(b) reacting said NCO-terminated polyurethane prepolymer with at least one amide-functionalized silane of the general formula (I) as described herein

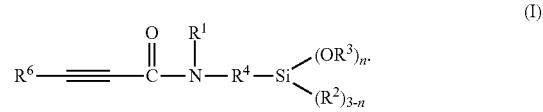

According to the above-described preferred embodiments of the present invention, a stoichiometric excess of the NCO group of the polyisocyanate(s) with respect to the OH group of the polyol(s) used is equal to 1.01 to 2.0, more 1.05 to 1.5. This ensures that a polyurethane prepolymer having terminal isocyanate groups is formed as a reaction product.

The thereby obtained NCO-terminated polyurethane prepolymer is then reacted with at least one amide-functionalized silane having the general formula (I) to obtain the silylated polyurethane according to the present invention, which comprises alkoxysilyl groups as reactive end groups. This requires that at least one molecule of the silane compound having the general formula (I) be used for each isocyanate group of the polyurethane prepolymer, the silane compound having the general formula (I) is used at a slight stoichiometric excess.

The above-described embodiments can be performed under the following conditions. In the first step at least one polyol and at least one isocyanate functional compound (polyisocyanate) are mixed together for 0.5 to 5 hours at temperature from −10 to 150° C., from 25 to 100° C. In the second step at least one silane compound having the general formula (I) is added as endcapper. Suitable reaction temperature is in a range between −10 and 150° C., between 25 and 100° C., more between 60 and 90° C. Reaction time largely depends on the selected isocyanate functional compound, endcapper and catalyst employed and is in range from 1 to 72 hours, from 6 to 12 hours. The above reactions are usually preformed without using a solvent. However, in case of high viscosity of the reaction mixture, solvents can be used. Useful solvents are acetone, butanone, ethyl acetate, toluene, acetonitrile, tetrahydrofuran and ethylene glycol dimethyl ether, hexane, heptane, pentane, cyclohexane and benzene.

In alternative embodiments of the present invention, without limitation, the silylated polyurethane is obtainable by
(a) reacting at least one polyisocyanate, diisocyanate, with at least one amide-functionalized silane of the general formula (I) as described herein

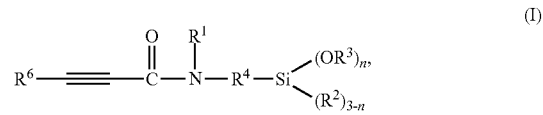

with a stoichiometric excess of the NCO group of the polyisocyanate(s) with respect to the amino group of the amide-functionalized silane(s) of the general formula (I) as described herein; and (b) reacting the reaction product obtained in step (a) with at least one polyol having a number average molecular weight of from 1000 to 50,000 g/mol.

According to the above-described alternative embodiments of the present invention, a stoichiometric excess of the NCO group of the polyisocyanate(s) with respect to the amino group of the amide-functionalized silane(s) of the general formula (I) used is equal to 1.1 to 3.0, more 1.5 to 2.5.

The above-described alternative embodiments can be performed under the following conditions. In the first step, at least one silane compound having the general formula (I) and at least one isocyanate functional compound (polyisocyanate) are mixed together for 0.1 to 5 hours at temperature from −10 to 150° C., from 0 to 80° C. In the second step at least one polyol is added to the NCO-terminated endcapper. Suitable reaction temperature is in a range between −10 and 150° C., between 25 and 100° C., more between 60 and 90° C. Reaction time largely depends on the selected isocyanate functional compound, endcapper and catalyst employed and is in range from 1 to 72 hours, from 6 to 12 hours. The reaction for forming a NCO-terminated endcapper is usually preformed without using a solvent. However, in cases of high viscosity of the reaction mixture, solvents can be used. Useful solvents are acetone, butanone, ethyl acetate, toluene, acetonitrile, tetrahydrofuran and ethylene glycol dimethyl ether, hexane, heptane, pentane, cyclohexane and benzene.

Alternatively, the silylated polyurethane according to the present invention is obtainable by one-pot synthesis by blending at least one polyol having a number average molecular weight of from 1000 to 50,000 g/mol, at least one polyisocyanate, diisocyanate, and at least one amide-functionalized silane of the general formula (I) as described herein.

In certain embodiments according to the present invention, aforementioned methods for preparing a silylated polyurethane further comprises a step of adding at least one catalyst. In principle, any compound that can catalyze reaction of a hydroxyl group and an isocyanate group to form a urethane bond can be used.

Suitable catalysts are organometallic Lewis acids like: iron or tin compounds, in particular the 1,3-dicarbonyl compounds of iron or of di- or tetravalent tin, tin(II) carboxylates or dialkyltin(IV) dicarboxylates, or the corresponding dialkoxylates, e.g., dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin (II) octaoate, tin(II) phenolate, dioctyltin distearate, dioctyltin dilaurate (DOTL), dioctyltin dimethylmaleate, dioctyltin diethylmaleate, dioctyltin dibutylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide, reaction products between dibutyltin oxides and phthalic acid esters, or the acetylacetonates of di- or tetravalent tin.

It is also possible to use alkyl titanates, such as tetrabutyl titanate and tetrapropyl titanate, organoaluminum compounds such as aluminum trisacetylacetonate, aluminum trisethylacetoacetate, and diisopropoxyaluminum ethylacetoacetate, chelate compounds such as zirconium tetraacetylacetonate and titanium tetraacetylacetonate, lead octanoate, organosilicon titanium compounds, or bismuth tris-2-ethylhexanoate, acid compounds such as phosphoric acid, p-toluenesulfonic acid, or phthalic acid, aliphatic amines such as butylamine, hexylamine, octylamine, decylamine, or laurylamine, aliphatic diamines such as, ethylenediamine, hexyldiamine, or also aliphatic polyamines such as diethylenetriamine, triethylenetetramine, tetraethylenepentamine, heterocyclic nitrogen compounds, e.g. piperidine, piperazine, aromatic amines such as m-phenylenediamine, ethanolamine, triethylamine, and so one.

Also suitable are the following tin compounds: di(n-butyl) tin(IV) sulfide, di(n-butyl)tin(IV) oxide, di(n-octyl)tin(IV) oxide, (n-butyl)$_2$Sn(SCH$_2$COO), (n-octyl)$_2$Sn(SCH$_2$COO), (n-octyl)$_2$Sn(SCH$_2$CH$_2$COO), (n-octyl)$_2$Sn (SCH$_2$CH$_2$COOCH$_2$CH$_2$OCOCH$_2$S), (n-butyl)$_2$Sn (SCH$_2$COO-i-C$_8$H$_{17}$)$_2$, (n-octyl)$_2$Sn(SCH$_2$COO-i-C$_8$H$_{17}$)$_2$, (n-octyl)$_2$Sn(SCH$_2$COO-n-C$_8$H$_{17}$)$_2$.

Chelate-forming tin organyls can also be used, for example di(n-butyl)tin(IV) di(acetylacetonate), di(n-octyl) tin(IV) di(acetylacetonate), (n-octyl)(n-butyl)tin(IV) di(acetylacetonate).

Tin-free catalysts are also particularly preferred. Boron halides, such as boron trifluoride, boron trichloride, boron tribromide, boron triiodide, or mixed boron halides, can thus furthermore be used as curing catalysts. Boron trifluoride complexes such as, for example boron trifluoride diethyl etherate (CAS no. [109-63-71]), which, as liquids, are easier to handle than the gaseous boron halides, are particularly preferred.

In addition to other catalysts also Lewis bases can be used like: trimethylamine, triethylamine, triphenylborane, triphenylphosphine, 1,8-diazabicycloundec-7-ene (DBU), 1,5-diazabicyclo[4.3.0]non-5-ene, 1,4-diazabicyclo[2.2.2]octane, 4-dimethylaminopyridine, 1,5,7-triazabicyclo[4.4.0] dec-5-ene, 7-methyl-1,5,7-triazabicyclo[4.4.0]dec-5-ene, 1,8-bis(tetramethylguanidino)naphthalene, 2-tert-butyl-1,1, 3,3-tetramethylguanidine, phosphazene base P$_4$-t-Bu, phosphazene base P$_1$-t-Bu-tris(tetramethylene), phosphazene base P$_2$-Et, phosphazene base P$_2$-t-Bu, phosphazene base P$_4$-t-Oct, phosphazene base P$_1$-t-Oct, imino-tris(dimethylamino)phosphorane, 2-tert-butylimino-2-diethylamino-1,3-dimethylperhydro-1,3,2-diazaphosphorine. Preferable catalysts are DBU and triethylamine.

In yet another aspect, the present invention provides a curable composition comprising at least one silylated polyurethane according to the present invention or obtainable by the aforementioned methods according to the present invention.

A "curable composition" is understood to be a substance or mixture of multiple substances, which is curable by physical or chemical measures. In this regard, these chemical or physical measures can be, for example, the supplying of energy in the form of heat, light, or other electromagnetic radiation, but also simply bringing into contact with atmospheric moisture, water, or a reactive component. The composition thereby changes from an original state to a state that has a higher hardness.

In preferred embodiments, the composition also contains at least one compound which has a hydrolysable silicon-containing group and a weight average molecular weight in the range of 100 to 1000 g/mol measured by GPC according to DIN 55672-1:2007-08. This compound is used as a crosslinking agent, and in addition to the hydrolysable silicon-containing group may contain further functional groups. The compound may be a silane coupling agent.

This type of coupling agent may be used as a tackifier, as an agent which influences the physical properties, as a drying agent, as a dispersion aid, or as a filler or the like. In particular, such a silane coupling agent can act as an adhesion promoter and increase the adhesion to various surfaces, for example glass, aluminum, stainless steel, zinc, copper, mortar, PVC, acrylic resins, polyester, polyethylene, polypropylene, and polycarbonate. Such a silane coupling agent may include reactive silicon-containing groups which may be defined analogously to the groups described above in conjunction with polymer component a). Alternatively, the groups may also be those of formula (IV):

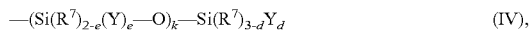

$$—(Si(R^7)_{2-e}(Y)_e—O)_k—Si(R^7)_{3-d}Y_d \quad \text{(IV)},$$

where $R^7$ is selected from a hydrocarbon residue containing 1 to 20 carbon atoms or a triorganosiloxane group of formula —O—Si($R^8$)$_3$, where each $R^8$ is independently selected from a hydrocarbon residue containing 1 to 20 carbon atoms; each Y is independently selected from a hydroxy group or a hydrolysable group, an oxime group or alkoxy group; and k is 0, 1, or 2; e is 0, 1, or 2 and d is 0, 1, 2, or 3, where d and e are both not 0, and k is 0 or an integer from 1 to 19, where d is not 0 when k is 0.

Compound of formula (IV) may contain further functional groups, including but not limited to primary, secondary, or tertiary amino groups, mercapto groups, epoxy groups, carboxyl groups, vinyl groups, isocyanate groups, isocyanurate groups, halogens, and the like.

Specific examples of these coupling agents include but are not limited to silanes containing isocyanate groups, such as gamma-isocyanate propyltrimethoxysilane, gamma-isocyanate propyltriethoxysilane, gamma-isocyanate propylmethyldiethoxysilane, gamma-isocyanate propylmethyldimethoxysilane, (isocyanate methyl)trimethoxysilane, (isocyanate methyl)methyldimethoxysilane, (isocyanate methyl)triethoxysilane, and (isocyanate methyl)diethoxymethylsilane, silanes containing amino groups, such as gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, 3-(N-ethylamino)-2-methylpropyltrimethoxysilane, gamma-ureidopropyltrimethoxysilane, gamma-ureidopropyltriethoxysilane, N-phenyl-gamma-aminopropyltrimethoxysilane, N-benzyl-gamma-aminopropyltrimethoxysilane, N-vinylbenzyl-gamma-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl] ethylenediamine; silanes of the ketimine type, such as N-(1,3-dimethylbutylidene)-3-(triethoxysilyl)-1-propanamine; silanes containing mercapto groups, such as gamma-mercaptopropyltrimethoxysilane, gamma-mercaptopropyltriethoxysilane, gamma-mercaptopropylmethyldimethoxysilane, gamma-mercaptopropylmethyldiethoxysilane, mercaptomethyltrimethoxysilane, and mercaptomethyltriethoxysilane; silanes containing epoxy groups, such as gamma-glycidoxypropyltrimethoxysilane, gamma-glycidoxypropyltriethoxysilane, gamma-glycidoxypropylmethyldimethoxysilane, beta-(3,4-epoxycyclohexyl)ethyltrimethoxysilane, and beta-(3,4-epoxycyclohexyl)ethyltriethoxysilane; carboxysilanes, such as beta-carboxyethyltriethoxysilane, beta-carboxyethylphenylbis(2-methoxyethoxy)silane, and N-beta-(carboxymethyl)aminoethyl-gamma-aminopropyltrimethoxysilane; silanes containing unsaturated groups of the vinyl type, such as vinyltrimethoxysilane, vinyltriethoxysilane, gamma-methacryloyloxypropylmethyldimethoxysilane, gamma-acryloyloxypropyltriethoxysilane, and methacryloyloxymethyltrimethoxysilane; silanes containing halogen, such as gamma-chloropropyltrimethoxysilane; and isocyanurate silanes, such as tris(3-trimethoxysilylpropyl)isocyanurate. In addition, partially condensed products or reaction products of the above-mentioned silanes may be used. Aminosilanes selected from the group consisting of bis(trimethylsilyl)amine, aminopropyltriethoxysilane, aminopropyltrimethoxysilane, bis[(3-triethoxysilyl)propyl] amine, bis[(3-trimethoxysilyl)propyl]amine, aminopropylmethyldiethoxysilane, aminoethylaminopropyltrimethoxysilane, aminoethylaminopropyltriethoxysilane, 3-[2-(2-aminoethylamino)ethylamino]propyltrimethoxysilane, phenylaminomethyltrimethoxysilane, aminoethylaminopropylmethyldimethoxysilane, 3-(N-phenylamino)propyltrimethoxysilane, 3-piperazinylpropylmethyldimethoxysilane, 3-(N,N-dimethylaminopropyl)aminopropylmethyldimethoxysilane, and combinations of two or more of the above-mentioned compounds are particularly preferred within the scope of the present invention.

Examples of compounds of formula (IV) which contain no additional functional groups include tetraalkoxysilanes (tetraalkylsilicates), such as tetramethoxysilane, tetraethoxysilane, ethoxytrimethoxysilane, dimethoxydiethoxysilane, methoxytriethoxysilane, tetra-n-propoxysilane, tetra-isopropoxysilane, tetra-n-butoxysilane, tetra-isobutoxysilane, and tetra-t-butoxysilane; trialkoxysilanes, such as methyltrimethoxysilane, methyltriethoxysilane, methyltriisopropoxysilane, methyltriphenoxysilane, ethyltrimethoxysilane, butyltrimethoxysilane, and phenyltrimethoxysilane; dialkoxysilanes, such as dimethyldimethoxysilane, diethyldimethoxysilane, and diphenyldimethoxysilane; monoalkoxysilanes, such as trimethylmethoxysilane and triphenylmethoxysilane; alkylisopropenoxysilanes, such as dimethyldiisopropenoxysilane and methyltriisopropenoxysilane; and the partially hydrolyzed condensates of these silanes.

The curable composition can also contain, in addition to the aforementioned silylated polyurethane according to the present invention, adjuvants and additives, such as catalysts, plasticizers, stabilizers, antioxidants, fillers, reactive diluents, drying agents, adhesion promoters and UV stabilizers, fungicides, flame retardants, rheological adjuvants, color pigments or color pastes, and so on.

A "plasticizer" is understood as a substance that decreases the viscosity of the compositions and thus facilitates processability. Hydrophilic plasticizers serve to improve moisture uptake and thus to improve reactivity at low temperatures. Suitable as plasticizers are, for example, adipic acid esters, azelaic acid esters, benzoic acid esters, butyric acid esters, acetic acid esters; esters of higher fatty acids having approximately 8 to approximately 44 carbon atoms, esters of OH-group-carrying or epoxidized fatty acids, fatty acid esters and fats, glycolic acid esters, phosphoric acid esters, phthalic acid esters of linear or branched alcohols containing 1 to 12 carbon atoms, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof. The asymmetrical esters of adipic acid monooctyl ester with 2-ethylhexanol (Edenol DOA, Cognis Deutschland GmbH, Dusseldorf) are particularly suitable.

Plasticizers can be additionally used in the composition at between 0 and 40, by preference between 0 and 20 wt. %, based on the total weight of the composition.

"Stabilizers" for purposes of this invention are to be understood as antioxidants, UV stabilizers, or hydrolysis stabilizers. Examples thereof are the commercially usual sterically hindered phenols and/or thioethers and/or substituted benzotriazoles and/or amines of the hindered amine light stabilizer (HALS) type. It is preferred in the context of the present invention if a UV stabilizer that carries a silyl group, and that is incorporated into the end product upon crosslinking or curing, is used. The products Lowilite 75, Lowilite 77 (Great Lakes, USA) are particularly suitable for this purpose. Benzotriazoles, benzophenones, benzoates, cyanoacrylates, acrylates, sterically hindered phenols, phosphorus, and/or sulfur can also be added.

The composition according to the present invention can contain up to 2 wt. %, by preference 1 wt. % of stabilizers, based on the total weight of the composition. In addition, the composition according to the present invention can further contain up to 7 wt. %, in particular up to 5 wt. % of antioxidants, based on the total weight of the composition.

The catalysts that can be used are all known compounds that can catalyze hydrolytic cleavage of the hydrolysable groups of the silane groupings, as well as subsequent condensation of the Si—OH group to yield siloxane groupings (crosslinking reaction and adhesion promotion function). Examples thereof are titanates such as tetrabutyl titanate and tetrapropyl titanate, tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo-(5,4,0)-undecene-7 (DBU), a low-molecular-weight polyamide resin obtained from an excess of a polyamine and a polybasic acid, adducts of a polyamine in excess with an epoxy, silane adhesion promoters having amino groups, such as 3-aminopropyltrimethoxysilane and N-(β-aminoethyl)aminopropylmethyldimethoxysilane.

The catalyst, mixtures of several catalysts, can be used in a quantity from 0.01 to 5 wt. % based on the entire weight of the composition.

The composition according to the invention may additionally contain fillers. Suitable examples here are chalk, lime powder, precipitated and/or pyrogenic silicic acid, zeolites, bentonites, magnesium carbonate, diatomaceous earth, alumina, clay, talc, titanium oxide, iron oxide, zinc oxide, sand, quartz, flint, mica, glass powder, and other ground mineral substances. In addition, organic fillers may also be used, in particular carbon black, graphite, wood fiber, wood flour, sawdust, cellulose, cotton, pulp, wood chips, chopped straw, and chaff. Moreover, short fibers such as glass fiber, glass filament, polyacrylonitrile, carbon fiber, Kevlar fiber, or also polyethylene fiber may be added. Powdered aluminum is likewise suitable as filler.

The pyrogenic and/or precipitated silicic acids advantageously have a BET surface area of 10 to 90 $m^2/g$. During use, they do not cause an additional increase in the viscosity of the composition according to the invention, but contribute to strengthening of the cured composition.

It is likewise conceivable to use pyrogenic and/or precipitated silicic acids having a larger BET surface area, advantageously 100-250 $m^2/g$, in particular 110-170 $m^2/g$, as filler. Due to the larger BET surface area, the same effect, for example strengthening the cured composition, may be obtained at a lower weight fraction. Further substances may thus be used to improve the composition according to the invention with regard to other requirements.

Furthermore, hollow spheres having a mineral shell or a plastic shell are suitable as filler. These may be, for example, hollow glass spheres which are commercially available under the trade name Glass Bubbles®. Hollow spheres based on plastic, for example Expancel® or Dualite®, are described in EP 0 520 426 B1, for example. These are composed of inorganic or organic substances, each having a diameter of 1 mm or less, 500 μm or less.

For some applications, fillers are preferred which impart thixotropy to the compositions. Such fillers are also described as rheological aids, for example hydrogenated castor oil, fatty acid amides, or swellable plastics such as PVC. To allow them to be easily pressed out of a suitable dosing device (a tube, for example), such compositions have a viscosity of 3000 to 15,000 m·Pas, 40,000 to 80,000 mPas, or also 50,000 to 60,000 m·Pas.

The fillers are used in a quantity of 1 to 80% by weight, based on the total weight of the composition.

Examples of suitable pigments are titanium dioxide, iron oxides, or carbon black.

In order to enhance shelf life even further, it is often advisable to further stabilize the composition according to the present invention with respect to moisture penetration using drying agents. A need occasionally also exists to lower the viscosity of the adhesive or sealant according to the present invention for specific applications, by using a reactive diluent. All compounds that are miscible with the adhesive or sealant with a reduction in viscosity, and that possess at least one group that is reactive with the binder, can be used as reactive diluents.

The following substances can be used, for example, as reactive diluents: polyalkylene glycols reacted with isocyanatosilanes (e.g. Synalox 100-50B, Dow), carbamatopropyltrimethoxysilane, alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforementioned compounds.

Also usable as reactive diluents are the following polymers of Kaneka Corp.: MS S203H, MS S303H, MS SAT 010, and MS SAX 350.

Silane-modified polymers that are derived, for example, from the reaction of isocyanatosilane with Synalox grades can likewise be used.

In the same manner, the silylated polyurethanes according to the present invention can be used in a mixture with usual polymers or prepolymers known per se, optionally with concurrent use of the aforementioned reactive diluents, fillers, and further adjuvants and additives. "Usual polymers or prepolymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforementioned silane-functional reactive diluents have at the same time a drying and/or adhesion-promoting effect in the composition. These reactive diluents may be used in quantities between 0.1 and 15 wt. %, by preference between 1 and 5 wt. %, based on the total weight of the composition.

Also suitable as adhesion promoters, however, are so-called tackifying agents, such as hydrocarbon resins, phenol resins, terpene-phenolic resins, resorcinol resins or derivatives thereof, modified or unmodified resin acids or resin esters (abietic acid derivatives), polyamines, polyaminoamides, anhydrides, and anhydride-containing copolymers. The addition of polyepoxide resins in small quantities can also improve adhesion on many substrates. The solid epoxy resins having a molecular weight of over 700, in finely ground form, are then used for this. If tackifying agents are used as adhesion promoters, their nature and quantity depend on the adhesive/sealant composition and on the substrate onto which it is applied. Typical tackifying resins (tackifiers) such as, for example, terpene-phenolic resins or resin acid derivatives, may be used in concentrations between 5 and 20 wt. %; typical adhesion promoters such as polyamines, polyaminoamides, or phenolic resins or resorcinol derivatives may be used in the range between 0.1 and 10 wt. %, based on the total weight of the composition.

Unless explicitly stated otherwise, all percent values provided in conjunction with the compositions described herein refer to % by weight, in each case based on the mixture in question.

The curable composition according to the invention is produced according to known methods by intimately mixing the components in suitable dispersion units, for example a high-speed mixer.

The present invention also provides the use of the curable composition comprising the silylated polyurethane according to the present invention as adhesives, sealants, spray foam and/or coatings. The compositions according to the invention are thus suitable for adhesively bonding plastics, metals, glass, ceramic, wood, wood-based materials, paper, paper-based materials, rubber, and textiles, for gluing floors, sealing building elements, windows, wall and floor coverings, and jointing in general. In this regard, the materials in each case may be adhesively bonded to themselves or with any other of the stated materials.

In principle in the present invention, all features listed within the context of the present text, particularly the embodiments, proportional ranges, components and other features of the composition according to the invention, of the method according to the invention and of the use according to the invention identified as preferred and/or special, can be implemented in all possible and not mutually exclusive combinations, with combinations of features identified as preferred and/or special also being regarded as preferred and/or special.

The following examples are used to explain the invention; however, the invention is not limited thereto.

EXAMPLES

Example 1: Preparation of N-2-propynamide-3-propyltriethoxysilane

In a dry round bottom flask under argon atmosphere 8.948 g (21.7 mmol) of dicyclohexylcarbodiimide (DCC) in 50 wt. % dichloromethane (DCM) was slowly added to a solution of 1.82 g (26.06 mmol) of propiolic acid in 10 ml of DCM and stirred for 30 minutes at 0° C. Afterwards, 4.81 g (21.72 mmol) of (3-aminopropyl)triethoxysilane (AMEO by trade name Geniosil GF 93 from WACKER AG) was added dropwise to the solution and stirred for 90 minutes while temperature was slowly raised from 0° C. to room temperature. After the reaction the precipitated 1,3-dicyclohexylurea was filtered off followed by solvent removal by coevaporation with toluene at room temperature. The product was a yellow viscous liquid of 93% purity.

Example 2: End-Capping of Polypropylene Glycol Using N-2-propynamide-3-propyltriethoxysilane In a dry round bottom flask under argon atmosphere 10 g of 4200 Acclaim polypropylene glycol (PPG, OH number 28±1.5 mg KOH/g) and 1.166 g (5.25 mmol) of isophorone diisocyanate (IPDI) were mixed and stirred for 1 hour at 70° C. The mixture was afterwards cooled down to room temperature. In the same flask 1.36 g (5 mmol) of N-2-propynamide-3-propyltriethoxysilane (Example 1) and 0.005 g (1 mol %) of triethylamine were added. The reaction mixture was stirred overnight at room temperature. Afterwards IR spectrum was measured to confirm that all NCO groups were reacted. The resulting prepolymer appeared as a yellow viscous liquid with a viscosity of 23.92 Pa·s at 25° C.

Comparative Example 1: End-Capping Method Using (3-aminopropyl)triethoxysilane

In an evacuated round bottom flask under argon atmosphere 10 g of 4200 Acclaim PPG (OH number 14±1.5 mg KOH/g) and 1.166 g (5.25 mmol) of IPDI were mixed and stirred for 1 hour at 70° C. In the same flask 1.105 g (5 mmol) of (3-aminopropyl)triethoxysilane was added. Reaction mixture was stirred overnight at 70° C. Afterwards IR spectrum was measured to confirm that all NCO groups were reacted. Resulting prepolymer appeared as a colorless viscous liquid with a viscosity of 73.08 Pa·s at 25° C.

The invention claimed is:

1. A silylated polyurethane that is the reaction product of a mixture comprising:

a) at least one polyol having a number average molecular weight of from 1000 to 50,000 g/mol;

b) at least one polyisocyanate, diisocyanate; and
c) at least one amide-functionalized silane of the general formula (I)

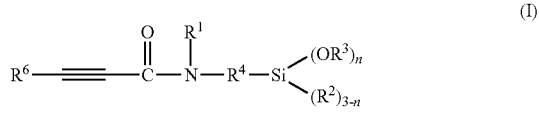

wherein
$R^1$ is hydrogen; $R^2$ and $R^3$ are same or different and are, independently from one another, selected from the group consisting of hydrogen and substituted or unsubstituted hydrocarbon residues, alkyl or aryl residues, more alkyl residues, having 1 to 20 carbon atoms, 1 to 8 carbon atoms, most methyl, ethyl, or n-propyl residue; $R^4$ is selected from linear or branched, substituted or unsubstituted hydrocarbon residues, alkyl residues, having 1 to 20 carbon atoms, 1 to 8 carbon atoms, more ethyl, n-propyl or n-butyl residue; $R^6$ is selected from the group consisting of hydrogen and linear or branched, substituted or unsubstituted hydrocarbon residues, alkyl or aryl residues, having 1 to 20 carbon atoms, 1 to 8 carbon atoms, more methyl, ethyl or n-propyl residue; and
n is 0, 1, 2 or 3, 3.

2. The silylated polyurethane according to claim 1, wherein the amide-functionalized silane of the general formula (I) is the reaction product of at least one aminosilane having a primary amino group with at least one compound having the general formula (II)

wherein $R^5$ is a hydrolysable group selected from the group consisting of a hydroxyl group, alkoxy or aryloxy residues having 1 to 20 carbon atoms, alkoxy residues having 1 to 8 carbon atoms, which can be interrupted by at least one heteroatom selected from N, O, and/or S, alkoxide, triflate, tosylate, and halogens; and $R^6$ is selected from the group consisting of hydrogen and linear or branched, substituted or unsubstituted hydrocarbon residues, alkyl or aryl residues, having 1 to 20 carbon atoms.

3. The silylated polyurethane according to claim 2, wherein the aminosilane having a primary amino group has the general formula (III)

wherein $R^1$, $R^2$, $R^3$, $R^4$ and n are the same as defined above.

4. The silylated polyurethane according to claim 1, wherein the at least one polyol comprises a polyether polyol.

5. The silylated polyurethane according to claim 1, wherein n in the general formulae (I) is 3.

6. The silylated polyurethane according to claim 1, wherein $R^3$ is selected from alkyl residues having 1 to 8 carbon atoms, methyl, ethyl or n-propyl.

7. The silylated polyurethane according to claim 1, wherein the silylated polyurethane is obtained by
(a) reacting at least one polyol having a number average molecular weight of from 1000 to 50,000 g/mol with at least one polyisocyanate, diisocyanate, with a stoichiometric excess of the NCO group of the polyisocyanate(s) with respect to the OH group of the polyol(s) to form a NCO-terminated polyurethane prepolymer; and
(b) reacting said NCO-terminated polyurethane prepolymer with at least one amide-functionalized silane of the general formula (I)

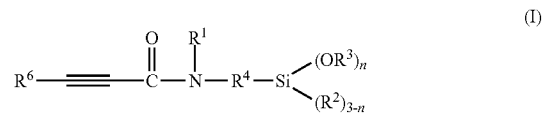

wherein $R^1$, $R^2$, $R^3$, $R^4$, $R^6$ and n are the same as defined above.

8. The silylated polyurethane according to claim 7, wherein a molar ratio of the NCO group of the polyisocyanate(s) to the OH group of the polyol(s) is from 1.01 to 2.0.

9. The silylated polyurethane according to claim 1, wherein the silylated polyurethane is obtained by
(a) reacting at least one polyisocyanate, with at least one amide-functionalized silane of the general formula (I)

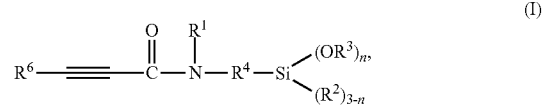

wherein $R^1$, $R^2$, $R^3$, $R^4$, $R^6$ and n are the same as defined above, with a stoichiometric excess of the NCO group of the polyisocyanate(s) with respect to the amino group of the silane(s) of the general formula (I); and
(b) reacting the reaction product obtained in step (a) with at least one polyol having a number average molecular weight of from 1000 to 50,000 g/mol.

10. The silylated polyurethane according to claim 9, wherein a molar ratio of the NCO group of the polyisocyanate(s) to the amino group of the amide-functionalized silane(s) of the general formula (I) is from 1.1 to 3.0.

11. A method for preparing a silylated polyurethane comprising reacting a mixture including:
a) at least one polyol having a number average molecular weight of from 1000 to 50,000 g/mol;
b) at least one polyisocyanate, diisocyanate; and
c) at least one amide-functionalized silane of the general formula (I)

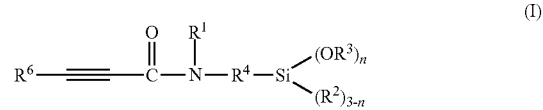

wherein

R$^1$ is hydrogen; R$^2$ and R$^3$ are same or different and are, independently from one another, selected from the group consisting of hydrogen and substituted or unsubstituted hydrocarbon residues, alkyl or aryl residues, more alkyl residues, having 1 to 20 carbon atoms, 1 to 8 carbon atoms, most methyl, ethyl, or n-propyl residue; R$^4$ is selected from linear or branched, substituted or unsubstituted hydrocarbon residues, alkyl residues, having 1 to 20 carbon atoms, 1 to 8 carbon atoms, more ethyl, n-propyl or n-butyl residue; R$^6$ is selected from the group consisting of hydrogen and linear or branched, substituted or unsubstituted hydrocarbon residues, alkyl or aryl residues, having 1 to 20 carbon atoms, 1 to 8 carbon atoms, more methyl, ethyl or n-propyl residue; and n is 0, 1, 2 or 3, 3.

12. A curable composition comprising the silylated polyurethane according to claim 1.

13. The curable composition according to claim 12, further comprising at least one component selected from plasticizer, stabilizer, antioxidant, filler, reactive diluent, drying agent, adhesion promoter, UV stabilizer, rheological agent, solvent and mixtures thereof.

14. An adhesive, sealant, spray foam and/or coating comprising the curable composition according to claim 12.

* * * * *